US008693725B2

(12) United States Patent
Bobbitt et al.

(10) Patent No.: US 8,693,725 B2
(45) Date of Patent: Apr. 8, 2014

(54) RELIABILITY IN DETECTING RAIL CROSSING EVENTS

(75) Inventors: Russell P. Bobbitt, Pleasantville, NY (US); Frederik C. M. Kjeldsen, Poughkeepsie, NY (US); Yun Zhai, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 13/089,597

(22) Filed: Apr. 19, 2011

(65) Prior Publication Data

US 2012/0269383 A1 Oct. 25, 2012

(51) Int. Cl.
*G06K 9/00* (2006.01)

(52) U.S. Cl.
USPC ........................................................ 382/103

(58) Field of Classification Search
USPC ........................................................ 382/103
See application file for complete search history.

(56) References Cited

U.S. PATENT DOCUMENTS

| | | | | |
|---|---|---|---|---|
| 4,807,027 A | * | 2/1989 | Muto | 348/148 |
| 5,331,312 A | * | 7/1994 | Kudoh | 340/541 |
| 5,787,369 A | * | 7/1998 | Knaak | 701/19 |
| 5,805,209 A | * | 9/1998 | Yuge et al. | 348/149 |
| 5,825,412 A | * | 10/1998 | Hobson et al. | 348/149 |
| 6,532,038 B1 | * | 3/2003 | Haring et al. | 348/148 |
| 2007/0040070 A1 | | 2/2007 | Stevenson et al. | |
| 2008/0073466 A1 | | 3/2008 | Mardirossian | |
| 2008/0169939 A1 | * | 7/2008 | Dickens et al. | 340/910 |
| 2010/0316257 A1 | * | 12/2010 | Xu et al. | 382/103 |

FOREIGN PATENT DOCUMENTS

| | | |
|---|---|---|
| DE | 19721901 A1 | 11/1997 |
| EP | 1600351 A1 | 11/2005 |
| JP | 2002029421 A | 1/2002 |

OTHER PUBLICATIONS

Zhai et al., "Virtual Boundary Crossing Detection without Explicit Object Tracking", 2009 Advanced Video and Signal Based Surveillance, IEEEE, pp. 518-523.
Hampapur et al., "Smart Video Surveillance", IEEE Signal Processing Magazine, Mar. 2005, pp. 38-52.
Comaniciu et al., "Real-Time Tracking of Non-Rigid Objects using Mean Shift", IEEE CVPR 2000, pp. 1-8.
Cucchiara et al., "Detecting Moving Objects, Ghosts and Shadows in Video Streams", IEEE Transactions on Pattern Analysis and Machine Intelligence, vol. 25, No. 10, Oct. 2003, pp. 1-6.
Fieguth et al., "Color-Based Tracking of Heads and Other Mobile Objects at Video Frame Rates", 1997 IEEE, pp. 21-28.
"IntelliVision", 1 page, retrieved Apr. 6, 2011 http://www.intelli-vision.com/.

(Continued)

*Primary Examiner* — Tom Y Lu
(74) *Attorney, Agent, or Firm* — Yee and Associates, P.C.; Matthew H. Chung

(57) ABSTRACT

A method, data processing system, apparatus, and computer program product for monitoring objects. A plurality of images of an area is received. An object in the area is identified from the plurality of images. A plurality of points in a region within the area is identified from a first image in the plurality of images. The plurality of points has a fixed relationship with each other and the region. The object in the area is monitored to determine whether the object has entered the region. A determination that the object has not entered the region is made in response to identifying an absence of a number of the plurality of points in a second image in the plurality of images.

20 Claims, 11 Drawing Sheets

(56) References Cited

OTHER PUBLICATIONS

"ObjectVideo Comprehensive Capabilities", pp. 1-2, retrieved Apr. 6, 2011 objectvideo.com/thesoftware/capabilities/.
Stauffer et al., "Learning Patterns of Activity Using Real-Time Tracking", IEEE Transactions on Pattern Analysis and Machine Intelligence, vol. 22, No. 8, Aug. 2000, pp. 747-758.
Tian et al., "Robust and efficient Foreground Analysis for Real-time Video Surveillance", IEEE Computer Society Conference on Computer Vision and Pattern Recognition, 2005. CVPR 2005, vol. 1, Jun. 20-25, 2005 pp. 1182-1187.
Tomasi et al., "Shape and Motion from Image Streams: a Factorization Method—part 3 Detection and Tracking of Point Features", Apr. 1991, CMU-CS-91-132, School of Computer Science, Carnegie Mellon University, Pittsburgh PA, pp. 1-38.
"Verint Video Intelligence Solutions", pp. 1-3, retrieved Apr. 6, 2011 verint.com/video_solutions/index.cfm.
Viola et al., "Robust Real-Time Object Detection", Second International Workshop on Statistical and Computational Theories of Vision—Modeling, Learning, Computing, and Sampling, Vancouver Canada Jul. 13, 2001, pp. 1-25.
Yilmaz, "Object Tracking: A Survey", ACM Computing Surveys, vol. 38, No. 4, Article 13, Dec. 2006, pp. 1-45.
GB search and examination report dated Jul. 19, 2012 regarding application GB1206610.6, 5 pages.
GB search report dated Dec. 7, 2012 regarding application GB1206610.6, applicant International Business Machines Corporation, 3 pages.

\* cited by examiner

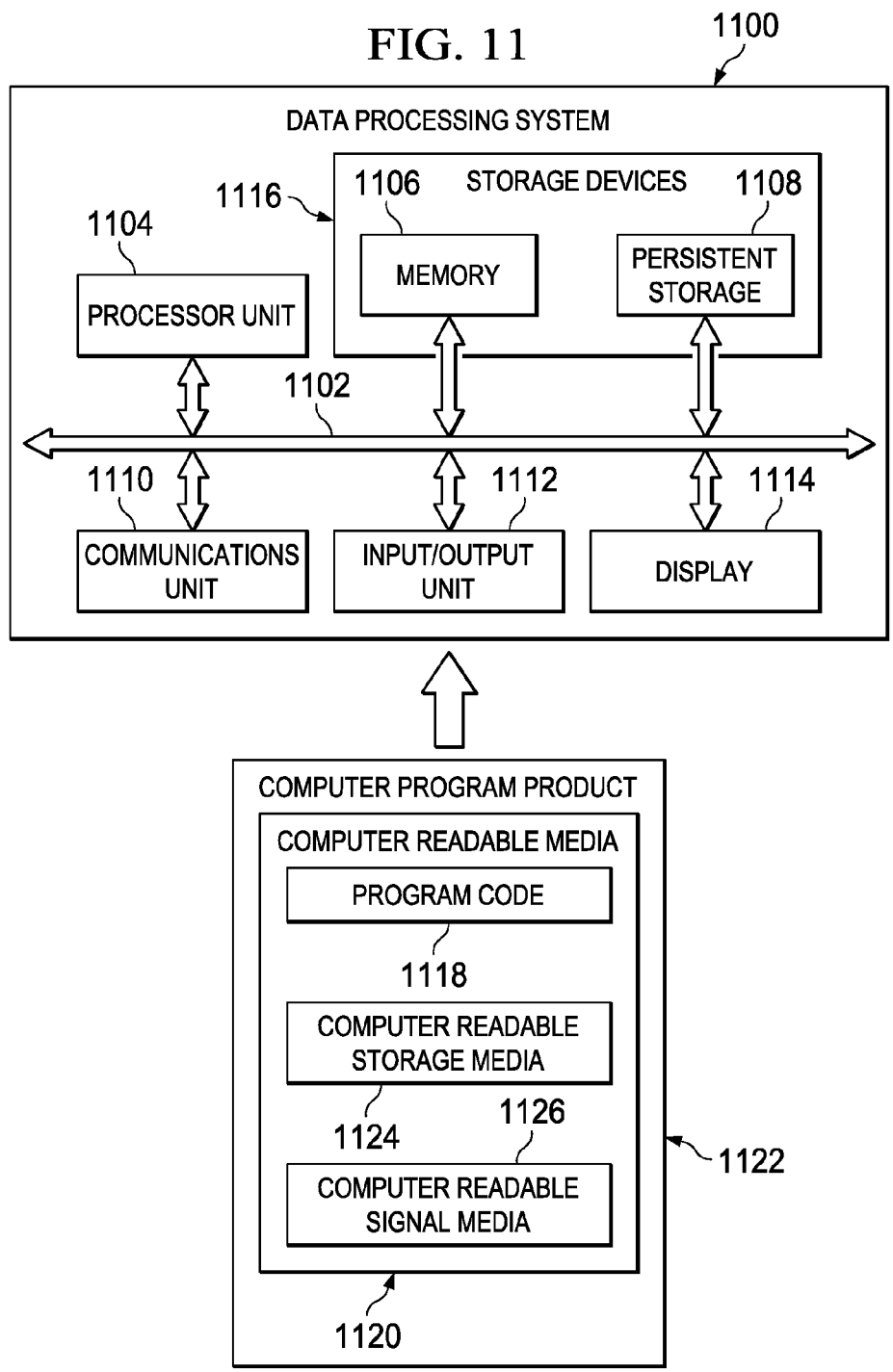

RELIABILITY IN DETECTING RAIL CROSSING EVENTS

BACKGROUND

1. Field

The disclosure relates generally to monitoring objects and more specifically to monitoring objects in proximity to railroad tracks. Still more particularly, the present disclosure relates to reducing an amount of false positives in detecting rail crossing events.

2. Description of the Related Art

As is known by those of skill in the art, video data can be used in detecting objects crossing railroad tracks. Monitoring objects in proximity to railroad tracks can be useful in improving both safety and security measures for railroad transportation. Objects within a range of a sensor can be monitored to detect if and when the object has crossed onto the railroad tracks. For example, the sensor can monitor to determine a position and a velocity of an object. Conventional systems can compare the position and velocity with information known about the position of the railroad tracks to determine if and when the object has crossed onto the railroad tracks. If the object has crossed onto the railroad tracks, the system may generate an alert to notify proper individuals of the occurrence of the crossing event.

Different types of sensors have been used in monitoring objects. Vision based solutions may include the use of a camera, for example. Vision based solutions may compare successive images to identify movement of an object relative to the railroad tracks. Conventional systems can also include non-visual solutions that employ sensors, such as for example, infrared sensors or motion sensors. The non-visual solutions can detect movement of objects in areas near the sensors.

However, conventional systems have drawbacks that may cause alerts of crossing events to be generated that are false positives. As used herein, a "false positive" is an identification of an occurrence of an event that has in fact not occurred. For example, non-visual solutions may not be able to distinguish between objects that should not be on the railroad tracks with a train that should be on the railroad tracks. In another example, a vision based solution may not be able to accurately distinguish objects moving in view of the camera from objects in the background. Additionally, objects closer to the camera may appear larger than objects further from the camera. An object may have appeared to have crossed onto the railroad tracks when the object is merely closer to the camera than the railroad tracks.

The number of false positives generated decreases the reliability in detecting rail crossing events. As the reliability decreases, the usefulness and importance of alerts generated by conventional systems also decreases. Accordingly, it would be advantageous to have a method and apparatus, which takes into account one or more of the issues discussed above as well as possibly other issues.

SUMMARY

The different illustrative embodiments provide a method, data processing system, and computer program product for monitoring objects. A plurality of images of an area is received. An object in the area is identified from the plurality of images. A plurality of points in a region within the area is identified from a first image in the plurality of images. The plurality of points has a fixed relationship with each other and the region. The object in the area is monitored to determine whether the object has entered the region. A determination that the object has not entered the region is made in response to identifying an absence of a number of the plurality of points in a second image in the plurality of images.

BRIEF DESCRIPTION OF THE SEVERAL VIEWS OF THE DRAWINGS

FIG. 11 is a block diagram of a data processing system in accordance with an illustrative embodiment.

DETAILED DESCRIPTION

Figure 1:
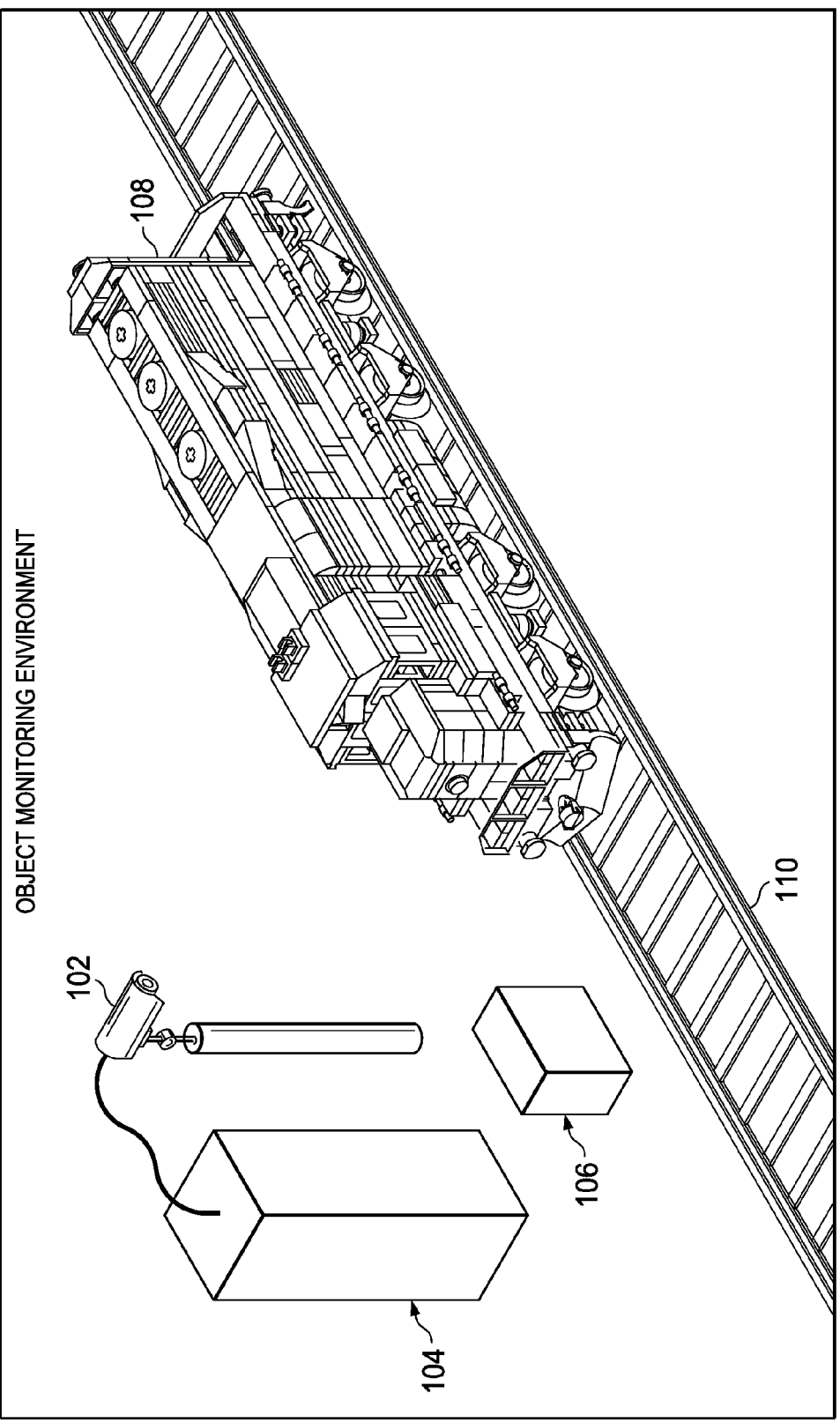
FIG. 1 is an illustration of an object monitoring environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The different illustrative embodiments recognize and take into account a number of different considerations. For example, the different illustrative embodiments recognize and take into account that it is desirable to reliably identify rail crossing events. A rail crossing event is when objects that should not be present on railroad tracks have crossed onto the railroad tracks. The different illustrative embodiments also recognize that is desirable to generate an alert of the reliably identified rail crossing event.

The different illustrative embodiments recognize that one solution may involve modeling an area around the railroad tracks. For example, images of the area may be processed to identify objects in the background that are not moving and objects in the foreground that can move. Systems using cameras or motion sensors can track the objects in the foreground to identify if and when the object has crossed on to the railroad tracks.

However, the different illustrative embodiments recognize and take into account that changes in lighting in the area around the railroad tracks can affect the tracking of the objects. For example, in low lighting situations, objects that can move may be incorrectly identified as background objects and not tracked. In other examples, shifting of light in the area around the tracks can cause background objects to appear mobile. For example, cloud movement or lights being turned on can cause background objects to be tracked as foreground objects. The shift in light can cause the system to inaccurately identify that an object has crossed onto the railroad tracks.

The different illustrative embodiments recognize and take into account that the train moving on the railroad tracks may cause an incorrect identification that an object has crossed on the railroad tracks. The movement of the train may cause a background modeling system to track the train as a foreground object. The train is moving on the tracks. Thus, an alert of a rail crossing event may be generated when in fact the train should be present on the tracks and no rail crossing event has occurred.

Thus, the different illustrative embodiments provide a method, data processing system, and computer program product for monitoring objects. A plurality of images of an area is received. An object in the area is identified from the plurality of images. A plurality of points in a region within the area is identified from a first image in the plurality of images. The plurality of points has a fixed relationship with each other and the region. The object in the area is monitored to determine whether the object has entered the region. A determination that the object has not entered the region is made in response to identifying an absence of a number of the plurality of points in a second image in the plurality of images. A "number", as used herein with reference to an item, means one or more items.

With reference now to the Figures and in particular FIG. 1, an illustration of an object monitoring environment is depicted in accordance with an illustrative embodiment. Object monitoring environment 100 is an environment in which illustrative embodiments may be implemented. For example, systems and methods for improving the reliability of detecting rail crossing events may be implemented in object monitoring environment 100.

In this illustrative example, object monitoring environment 100 includes sensor 102 and data processing system 104. Sensor 102 senses objects 106 and train 108 in object monitoring environment 100. For example, sensor 102 may be a camera, an infrared sensor, a motion sensor, a structured light sensor, a radar device, a sonar device, and/or any other sensor suitable for sensing objects in object monitoring environment 100. Sensor 102 may include multiple sensors positioned in multiple places in object monitoring environment 100. Train 108 is a vehicle or set of vehicles that moves along railroad tracks 110. A "set," as used herein with reference to an item, means one or more items. Train 108 may be a subway, a passenger train, a freight train, a tram, a trolley, and/or any other type of vehicle that moves along railroad tracks 110.

Data processing system 104 processes data received from sensor 102 to identify whether objects 106 have crossed onto railroad tracks 110. In these examples, objects 106 are objects that should not be present on railroad tracks 110. For example, objects 106 may include people, vehicles, animals, and or other objects that should not be present on railroad tracks 110. Data processing system 104 includes systems and methods for reliably distinguishing between objects 106 that should not be present on railroad tracks 110 and train 108.

Figure 2:
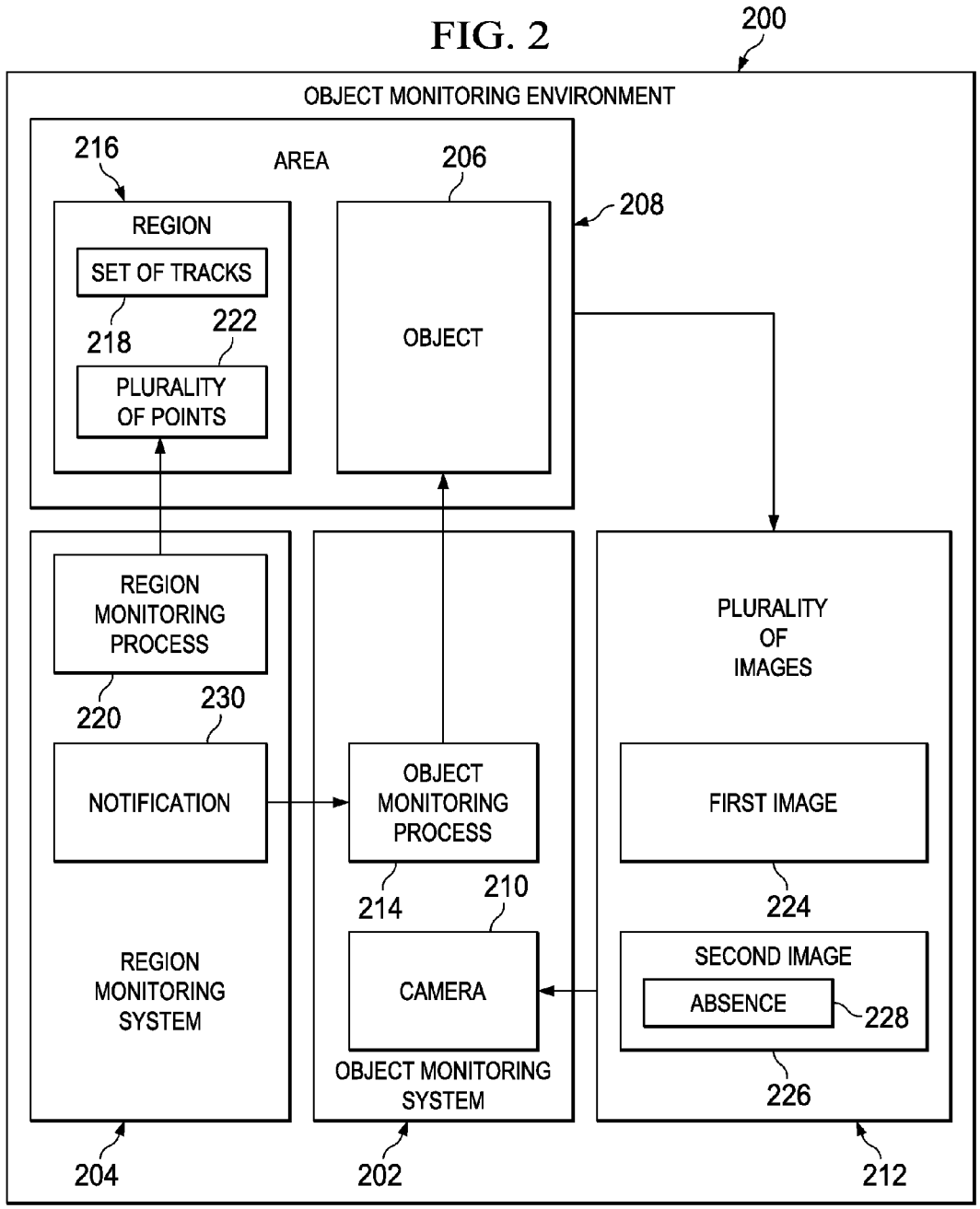
FIG. 2 is a block diagram of an object monitoring environment in accordance with an illustrative embodiment.

With reference now to FIG. 2, a block diagram of an object monitoring environment is depicted in accordance with an illustrative embodiment. Object monitoring environment 100 in FIG. 1 is an example of one implementation of object monitoring environment 200 in FIG. 2.

In these illustrative examples, object monitoring environment 200 includes both object monitoring system 202 and region monitoring system 204. Object monitoring system 202 monitors object 206 in area 208. Object monitoring system 202 monitors object 206 using camera 210. For example, camera 210 generates plurality of images 212 of area 208. Object monitoring system 202 receives plurality of images 212. Object monitoring process 214 in object monitoring system 202 processes plurality of images 212. For example, object monitoring process 214 may compare successive images to determine the position of object 206, whether object 206 has moved, and a direction that object 206 moved.

Region monitoring system 204 monitors region 216 in area 208. In these illustrative examples, region 216 is a region surrounding a portion of set of tracks 218. For example, region 216 may include the set of tracks and the space between the rails of set of tracks 218. In other examples, region 216 includes a predefined amount of space on either side of set of tracks 218. Region 216 includes the portion of set of tracks 218 that is located within area 208. For example, without limitation, area 208 may be a rail station or a railroad track crossing. Thus, region 216 could be the region surrounding the portion of set of tracks 218 within a rail station or a railroad track crossing. In other examples, region 216 may be a region beyond a platform at a rail station or a region between signs or arms at a railroad crossing.

Region monitoring system 204 includes region monitoring process 220 for identifying region 216 in area 208. Region monitoring process 220 receives plurality of images 212 of area 208 generated by camera 210. Region monitoring process 220 processes plurality of images 212 to identify region 216 within area 208. In these examples, region 216 is a region of interest in area 208 that object 206 should not be present inside. For example, region monitoring process 220 identifies set of tracks 218 in first image 224 in plurality of images 212 as region 216. Region monitoring process 220 may also identify additional space surrounding set of tracks 218 as region 216.

Region monitoring process 220 then identifies plurality of points 222 in region 216. In these examples, plurality of points 222 are points within region 216 in first image 224 that have a high level of contrast with surrounding points in first image 224. For example, plurality of points 222 include interest points in region 216. Traditional railroads include rails positioned on railroad ties and track ballast commonly comprised of crushed stone. These types of surfaces have sharp contours and result in high levels of contrast between points in images to the railroad. Region monitoring process 220 may identify a set of points along set of tracks 218 in first image 224 as plurality of points 222. Region monitoring process 220 may also identify a set of points along an edge of set of tracks 218 or other places of contrast in region, such as points along the railroad ties or track ballast.

Region monitoring process 220 also processes other images in plurality of images 212 to determine whether plurality of points 222 is still present. For example, region monitoring process 220 receives second image 226 of area 208. Region monitoring process 220 determines from second image 226 whether all of the points in plurality of points 222 are present. If region monitoring process 220 identifies absence 228 of a certain number of the points in plurality of points 222, region monitoring process 220 generates notification 230. In these examples, notification 230 is not an alert that object 206 has entered region 216, rather notification 230 is a notification that a train has entered region 216. The train is in the region and has blocked points in plurality of points 222 from camera 210.

Region monitoring process 220 sends notification 230 to object monitoring process 214. When object monitoring process 214 receives notification 230, object monitoring process 214 will know that a train has entered region 216. Rather than generating an alert of a rail crossing event, object monitoring process 214 will be notified that a train has entered region 216. Thus, region monitoring process 220 reduces an amount of false positives that would be generated by object monitoring system 202. Region monitoring process 220 improves the reliability in detecting rail crossing events.

The illustration of object monitoring environment 200 in FIG. 2 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, object monitoring system 202 and region monitoring system 204 may use the same hardware resources while having separate processes for performing the functions of the respective systems. In other examples, object monitoring system 202 and region monitoring system 204 may be the same system and process for both monitoring objects while improving the reliability in detecting rail crossing events.

In other illustrative embodiments, other sensors in addition to or in place of camera 210 may be used in monitoring area 208. For example, without limitation, object monitoring system 202 may include an infrared sensor, a motion sensor, a structured light sensor, a radar device, a sonar device, and/or any other sensor suitable for monitoring area 208 in object monitoring environment 200.

Figure 3:
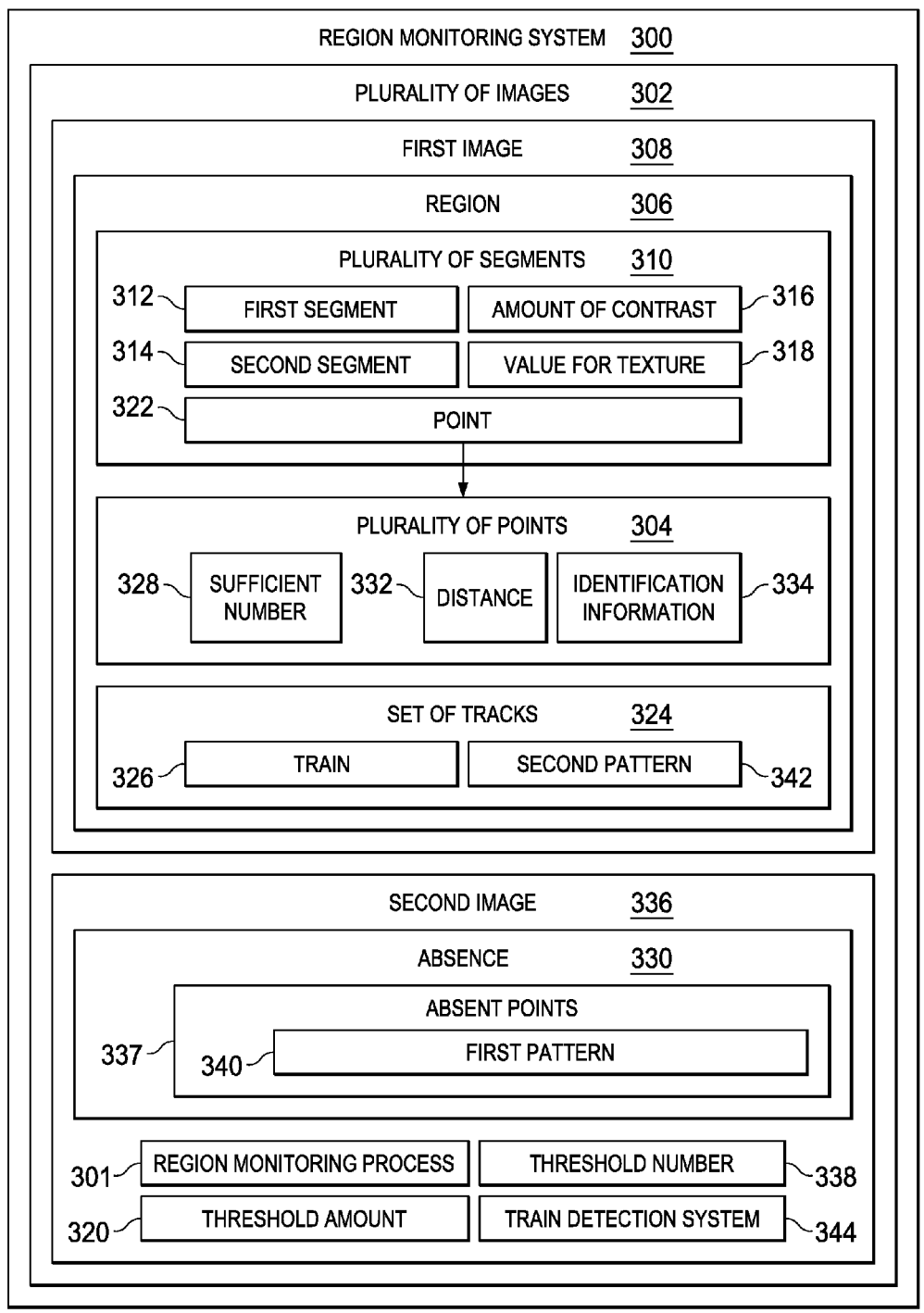
FIG. 3 is a block diagram of a region monitoring system in accordance with an illustrative embodiment.

With reference now to FIG. 3, a block diagram of a region monitoring system is depicted in accordance with an illustrative embodiment. In these examples, region monitoring system 300 is an example of one embodiment of region monitoring system 204 in FIG. 2. Region monitoring system 300 provides greater detail of an embodiment of region monitoring system 204 in FIG. 2.

Region monitoring process 301 in region monitoring system 300 processes plurality of images 302 of region 306. For example, region monitoring system 300 receives first image 308. First image 308 includes an image of region 306. Region monitoring process 301 processes first image 308 into plurality of segments 310. Plurality of segments 310 is a grouping of pixels in first image 308. Region monitoring process 301 divides different portions of first image 308 into plurality of segments 310. For example, segments in plurality of segments 310 may be divided into groups based on pixels in first image 308 having similar levels of values for color, contrast, texture, or brightness. Region monitoring process 301 also identifies value for texture 318 for segments in plurality of segments 310.

Region monitoring process 301 compares segments in plurality of segments 310 to identify plurality of points 304. For example, region monitoring process 301 compares first segment 312 with second segment 314. Region monitoring process 301 indentifies amount of contrast 316 in texture between first segment 312 and second segment 314. In this example, first segment 312 and second segment 314 are adjacent segments. Region monitoring process 301 compares first segment 312 with second segment 314 to identify whether a high level of contrast exists between first segment 312 and second segment 314. For example, region monitoring process 301 may compare amount of contrast 316 with threshold amount 320. If amount of contrast 316 between first segment 312 and second segment 314 exceeds threshold amount 320, region monitoring process 301 identifies point 322 as one of plurality of points 304.

Region monitoring process 301 identifies distance 332 and identification information 334. Distance 332 is a distance between point 322 and other points in plurality of points 304. Identification information 334 is information used for locating point 322 in later images. For example, identification information 334 may include coordinates of one or more pixels comprised by point 322 in first image. Identification information 334 may also include information descriptive of point 322, such as for example, the difference in amount of contrast 316 between point 322 and surrounding points in first image 308. Further, identification information 334 may include values for color, contrast, texture, or brightness of one or more pixels in point 322. In these examples, plurality of points 304 has a fixed relationship with each other in first image 308. The fixed relationship between points within plurality of points 304 allows for plurality of points 304 to be located in other images in plurality of images 302. The fixed relationship is based on identification information 334.

In these examples, point 322 is a point where a high level of contrast exists in first image 308. Points in first image 308 that surround point 322 have much higher or lower values for texture. Threshold amount 320 of difference in contrast may be selected by an administrator based on lighting conditions in region 306. For example, changes in lighting conditions in region 306 may affect whether points in plurality of points 304 can be identified. For example, if clouds cover parts of region 306, it may be more difficult for region monitoring process 301 to identify plurality of points 304 in subsequent images. Thus, threshold amount 320 is selected to allow for changes in lighting conditions while still being able to identify plurality of points 304 in region 306.

Region monitoring process 301 may repeat this process until sufficient number 328 of points have been identified for plurality of points 304. For example, plurality of points 304 may be selected to form a line along a length of one or more rails in set of tracks 324. Plurality of points 304 may also be selected to form a curve along or around set of tracks 324. An administrator may select sufficient number 328 to allow region monitoring process 301 to identify that train 326 is in region 306. For example, sufficient number 328 may be selected such that plurality of points 304 span a length that is longer than a person or a vehicle that should not be in region 306. Thus, absence 330 a number of plurality of points 304 would indicate that train 326 rather than a person or vehicle is in region 306.

Additionally, region monitoring process 301 may employ a number of different methods and algorithms for identifying plurality of points 304 in region 306. For example, region monitoring process 301 may use corner detection and edge detection to detect corners and edges formed by set of tracks 324. Region monitoring process 301 may also use blob detection and any associated algorithms to identify areas or high contrast.

Once plurality of points 304 has been identified, region monitoring process 301 processes subsequent images received to determine whether plurality of points 304 is present in the subsequent images. For example, region monitoring process 301 may search second image 336 using identification information 334 to attempt to locate plurality of points 304 in second image 336. If region monitoring process 301 cannot locate all of the points of plurality of points 304 in second image 336, region monitoring process 301 identifies absence 330 of a number of points that are absent from second image 336 to form absent points 337. Based on absence 330, region monitoring process 301 may determine that train 326 is present in region 306.

For example, region monitoring process 301 determines whether the number of absent points 337 exceeds threshold number 338. In these examples, threshold number 338 is selected such that when absent points 337 exceeds threshold number 338 train 326 is present in region 306. Threshold number 338 is selected based on distance 332 between points in plurality of points 304 and a location of points in plurality of points 304. For example, based on the distance and the location of absent points 337, region monitoring process 301 would be able to identify that the size of the item blocking absent points 337 is that of train 326 rather than a person or vehicle.

Additionally, region monitoring process 301 may consider first pattern 340 of absent points 337 in determining whether train 326 is present in region 306. For example, second pattern 342 formed by train 326 entering region 306 may be obtained from an image of train 326 previously entering region 306 or based on known dimensions of train 326. Region monitoring process 301 can compare first pattern 340 with second pattern 342. If the patterns match, region monitoring process 301 will determine that train 326 has entered region 306. In this manner, region monitoring system 300 may be an example of train detection system 344.

Figure 4:
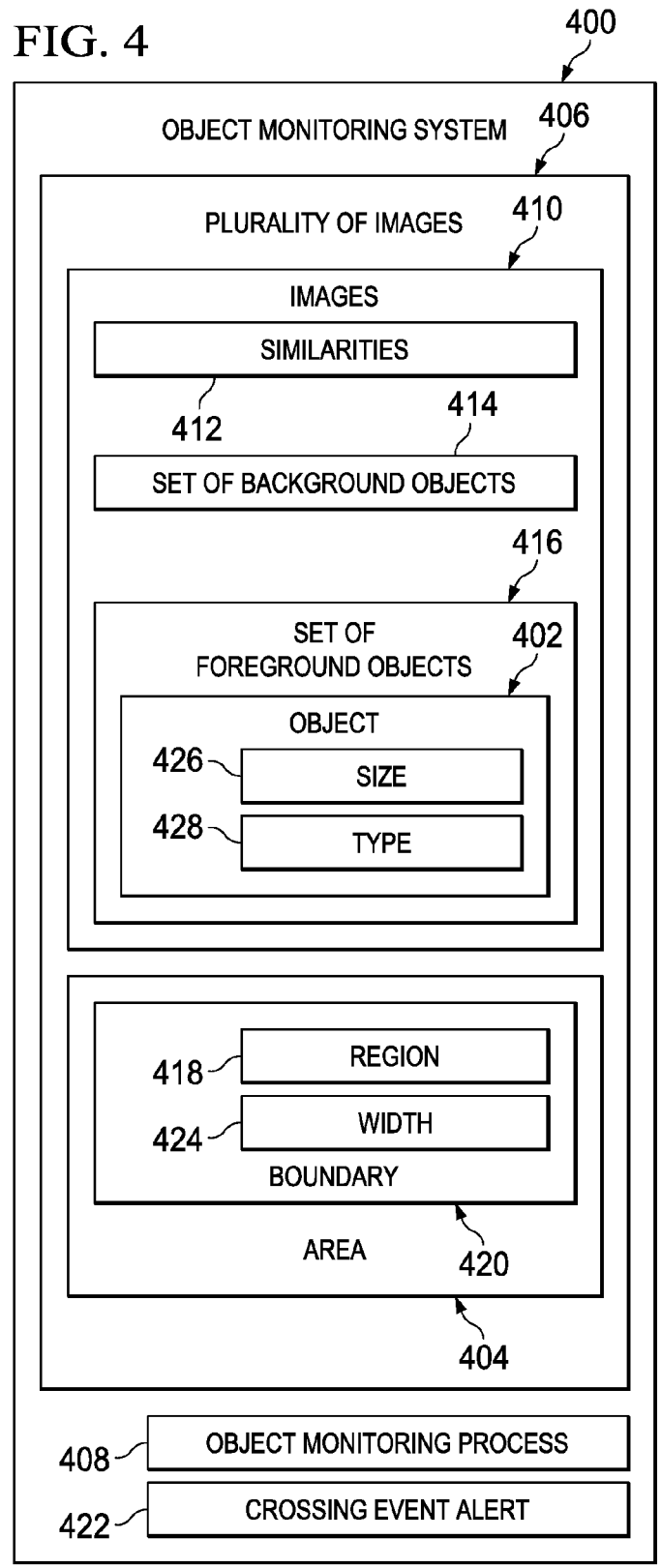
FIG. 4 is a block diagram of an object monitoring system in accordance with an illustrative embodiment.

With reference now to FIG. 4, a block diagram of an object monitoring system is depicted in accordance with an illustrative embodiment. In these examples, object monitoring system 400 is an example of one embodiment of object monitoring system 202 in FIG. 2. Object monitoring system 400 provides greater detail of an embodiment of object monitoring system 202 in FIG. 2.

Object monitoring system 400 monitors object 402 in area 404 using plurality of images 406. For example, object monitoring system 400 may use background modeling in tracking object 402 in area 404. Object monitoring system 400 receives plurality of images 406. Object monitoring process 408 in object monitoring system 400 compares images 410 to identify similarities 412 between images 410. For example, similarities 412 may be the result of items in images 410 that have remained stationary over a period of time. Object monitoring process 408 will identify items in images 410 that have remained stationary over a period of time as set of background objects 414. Object monitoring process 408 may not have to monitor set of background objects 414 in images 410.

On the other hand, items in images 410 that show signs of movement or change between images 410 are identified as set of foreground objects 416. Object monitoring process 408 will monitor the movement of set of foreground objects 416 in area 404.

Object monitoring process 408 also identifies region 418 in area 404 from images 410. Region 418 is a region in which set of foreground objects 416 should not be present. Object monitoring process 408 also identifies boundary 420 surrounding region 418 in images 410. For example, boundary 420 is a virtual boundary in area 404 that once crossed by object 402 may cause crossing event alert 422 to be generated. Object monitoring process 408 monitors object 402 to determine if and when object 402 has crossed boundary 420. Boundary 420 may also include width 424. Width 424 is a threshold distance that object 402 may cross boundary 420 without object monitoring process 408 determining that object 402 has entered region 418. Width 424 may be selected by an administrator to reduce false positives. For example, width 424 may allow for a person's foot on the edge of a platform to not result in generation of crossing event alert 422.

Object monitoring process 408 also receives notifications of whether a train is present in region 418. Ordinarily a moving train would be treated as one of set of foreground objects 416. If the train entered region 418, object monitoring process 408 may generate crossing event alert 422. However, if object monitoring process 408 has been notified that a train is present in region 418, object monitoring process 408 will determine that a train rather than the object is present in region 418. Additionally, if the train has been stationary for a period of time, object monitoring process 408 may treat the train as one of set of background objects 414. However, a region monitoring process, such as region monitoring process 301 in FIG. 3, would still be able to detect the presence of the train by virtue of absent interest points, as previously discussed. The object monitoring process 408 is notified that the train is present and is able to better track set of foreground objects 416 in area 404.

In these illustrative examples, object monitoring process 408 may also identify size 426 and type 428 of object 402. Object monitoring process 408 sends information regarding size 426 and type 428 to a region monitoring process, such as region monitoring process 301 in FIG. 3. The region monitoring process may then use size 426 and type 428 in selecting a threshold number of points that may be absent from an image in determining whether a train is present. For example, the threshold number may be selected such that objects of size 426 and type 428 in region 418 would not be detected as a train.

Figure 5:
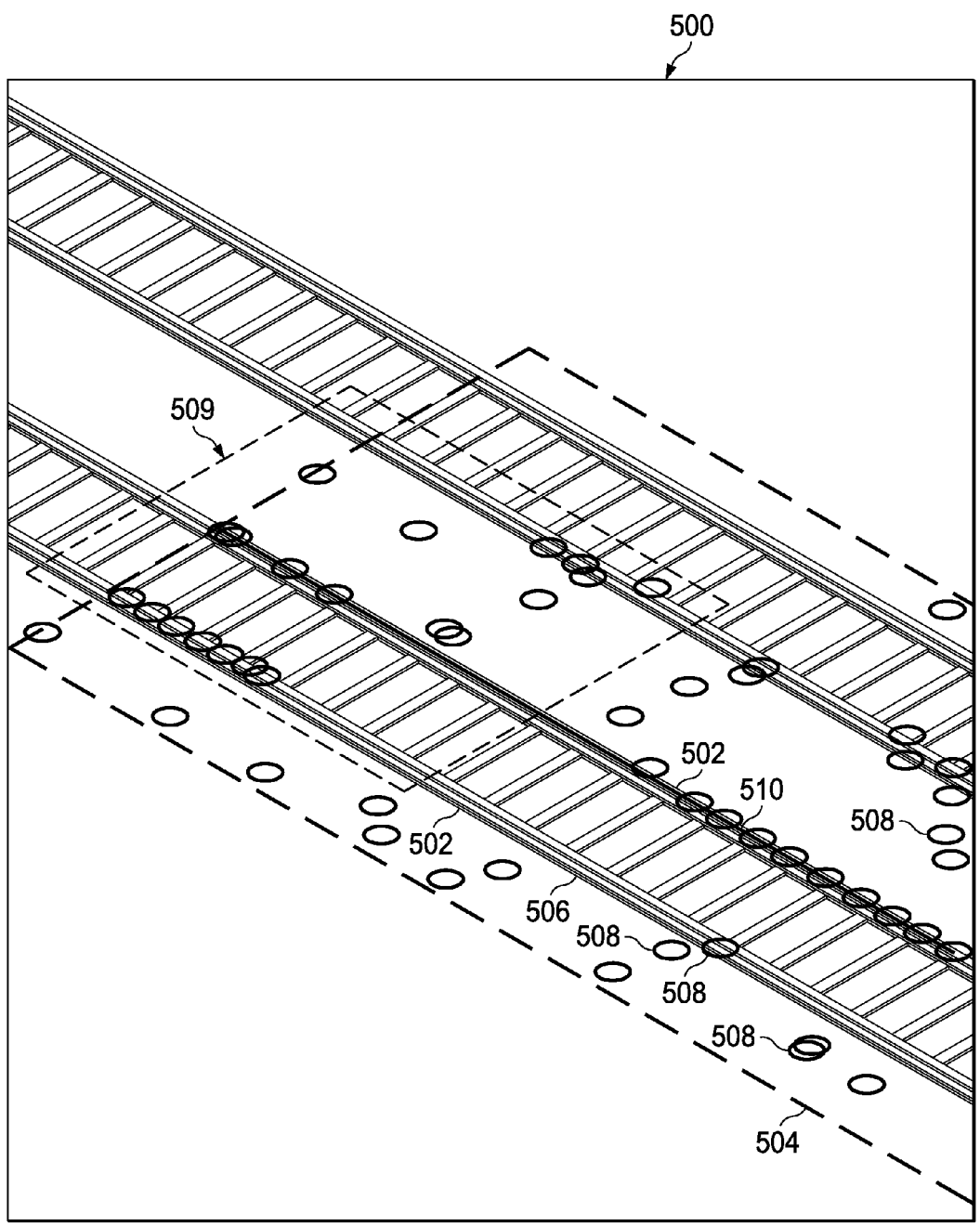
FIG. 5 is an illustration of an image of a plurality of interest points identified on a set of tracks in accordance with an illustrative embodiment.

With reference now to FIG. 5, an illustration of an image of plurality of interest points identified on a set of tracks is depicted in accordance with an illustrative embodiment. In this illustrative example, image 500 is an image of set of tracks 502. Image 500 is an example of first image 308 in FIG. 3. Image 500 includes boundary 504. Boundary 504 is a virtual boundary identified in image 500. For example, boundary 504 surrounds region of interest 506 comprising a portion of set of tracks 502.

In this example plurality of interest points 508 and plurality of interest points 509 are interest points that have been identified in image 500. In this example, plurality of interest points 508 is located along set of tracks 502. In other examples, plurality of interest points 508 may take the form of a line or curve. For example, plurality of interest points 508 can form line 510 along set of tracks 502.

Figure 6:
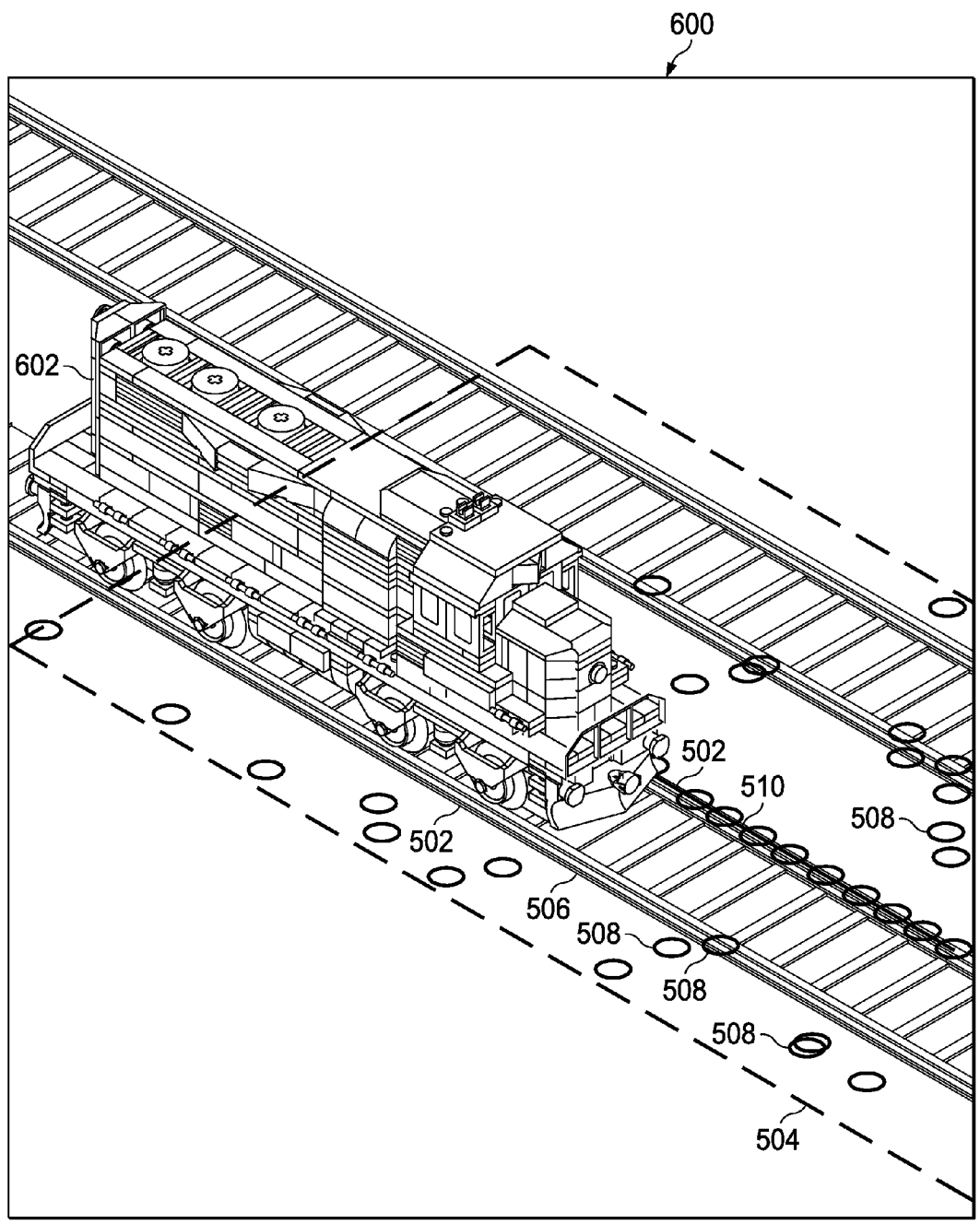
FIG. 6 is an illustration of an image of a train detected on the set of tracks illustrated in FIG. 5 in accordance with an illustrative embodiment.

With reference now to FIG. 6, an illustration of a train detected on the set of tracks illustrated in FIG. 5 is depicted in accordance with an illustrative embodiment. In this illustrative example, image 600 is an image of set of tracks 502 generated at a different time than image 500 in FIG. 5. In this example, train 602 is present on set of tracks 502. Train 602 may be identified as a train using plurality of interest points 508.

As illustrated in image 600, plurality of interest points 509 in FIG. 5 is no longer seen in image 600. Train 602 has blocked plurality of interest points 509 from being seen in image 600. For example, if a number of interest points in plurality of interest points 508 and 509 are missing in image 600, a train detection system, such as train detection system 344 in FIG. 3, can detect that train 602 has crossed boundary 504 rather than an object. In another example, if a pattern of interest points in plurality of interest points 508 and 509 that is missing in image 600 matches a pattern of a train crossing boundary 504, the train detection system can detect that train 602 has crossed boundary 504 rather than an object.

Also, as illustrated in FIG. 6 a portion of line 510 is also blocked by train 602 and cannot be seen in image 600. For example, a length of the portion of line 510 that is missing in image 600 exceeds a predetermined length, a train detection system, such as train detection system 344 in FIG. 3, can detect that train 602 has crossed boundary 504 rather than an object.

Figure 7:
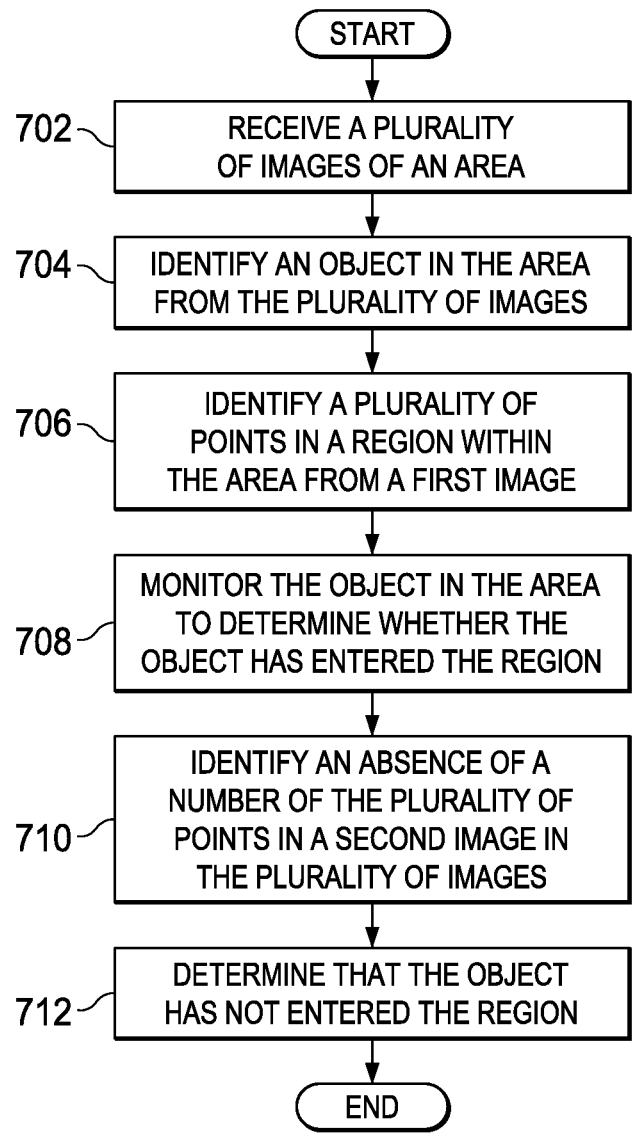
FIG. 7 is a flowchart of a process for monitoring an object in accordance with an illustrative embodiment.

With reference now to FIG. 7, an illustration of a flowchart of a process for monitoring an object is depicted in accordance with an illustrative embodiment. The process illustrated in FIG. 7 may be implemented in data processing system 104 operating in object monitoring environment in FIG. 1.

The process begins by receiving a plurality of images of an area (step 702). In step 702, for example, the area may be an area near a set of tracks. The process then identifies an object in the area from the plurality of images (step 704). Thereafter, the process identifies a plurality of points in a region within the area from a first image (step 706). The process then monitors the object in the area to determine whether the object has entered the region (step 708). In step 708, the object is an object that should not be present in the region. The object may be monitored using background modeling.

Thereafter, the process identifies an absence of a number of the plurality of points in a second image in the plurality of images (step 710). The process then determines that the object has not entered the region, with the process terminating thereafter (step 712). In step 712, ordinarily an absence of the number of the plurality of points would indicate that something is present in the region and thus an alert may be generated. However, in step 712 the process may determine that the absence means that a train is present in the area. Thus, the process would not generate an alert effectively reducing a number of false positives and improving the reliability in detecting crossing events.

Figure 8:
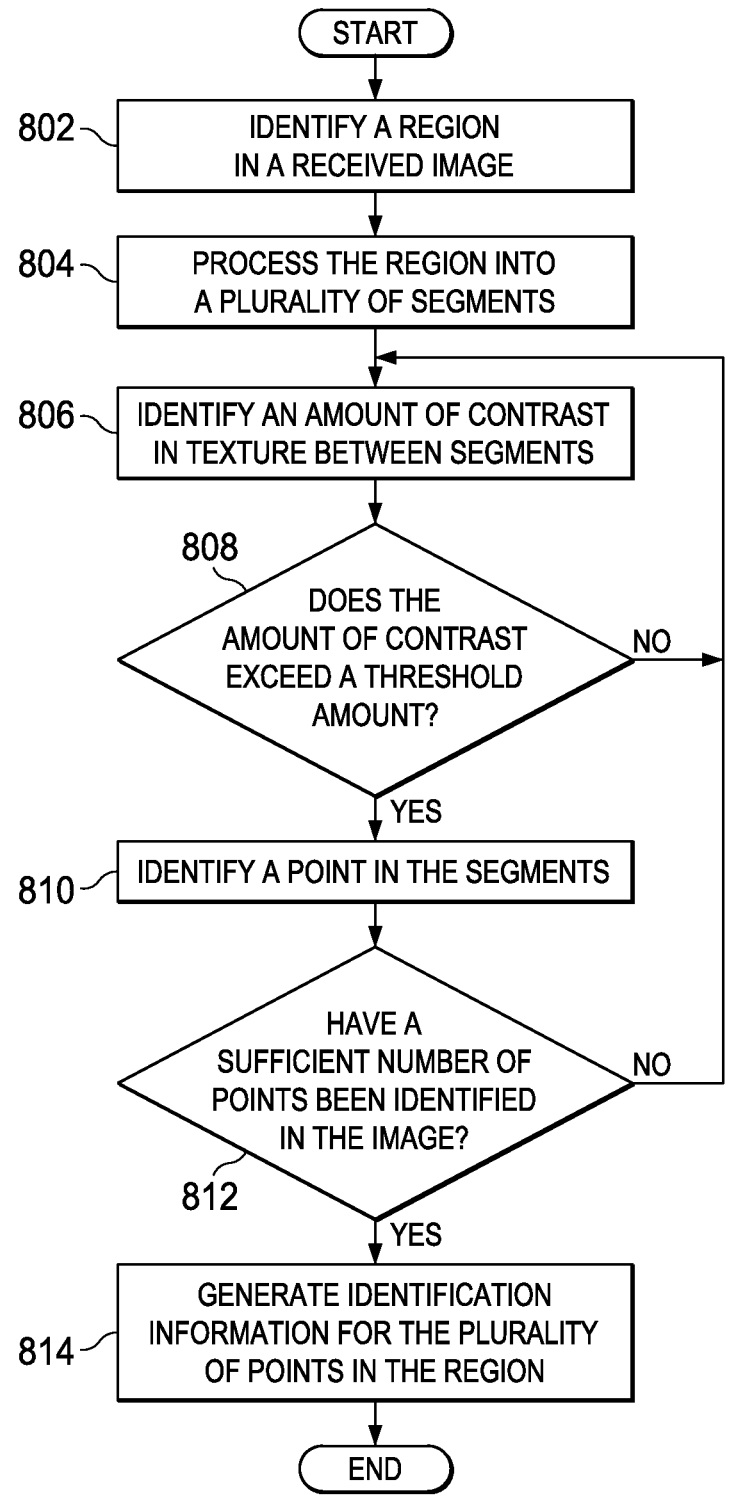
FIG. 8 is a flowchart of a process for identifying interest points in a region of interest in accordance with an illustrative embodiment.

With reference now to FIG. 8, an illustration of a flowchart of a process for identifying interest points in a region of interest is depicted in accordance with an illustrative embodiment. The process illustrated in FIG. 8 may be implemented by region monitoring process 301 in region monitoring system 300 in FIG. 3.

The process begins by identifying a region in a received image (step 802). Thereafter, the process processes the region into a plurality of segments (step 804). The process then identifies an amount of contrast in texture between segments (step 806). Thereafter, the process determines whether the amount of contrast exceeds a threshold amount (step 808). If the process determines that the amount of contrast does not exceed the threshold amount, the process returns to step 806 and identifies an amount of contrast in texture between other segments. The process will seek to identify other segments that have an amount of contrast greater than the threshold amount.

If the process determines that the amount of contrast exceeds the threshold amount, the process identifies a point in the segments (step 810). In step 810, the point may be a point between the segments. In another example, the point may be a point located in one of the first and second segments that has the largest value for contrast with surrounding points among other points in the first and second segments.

Thereafter, the process determines whether a sufficient number of points have been identified in the image (step 812). In step 812, a sufficient number of points have been identified when a train detection system can distinguish between trains in the region and objects in the region. If the process determines that a sufficient number of points have not been identified, the process returns to step 806 and identifies an amount of contrast in texture between other segments. If the process determines that a sufficient number of points have been identified, the process generates identification information for the plurality of points in the region, with the process terminating thereafter (step 814). In step 814, the identification information is used to later identify the plurality of points in other images of the area.

Figure 9:
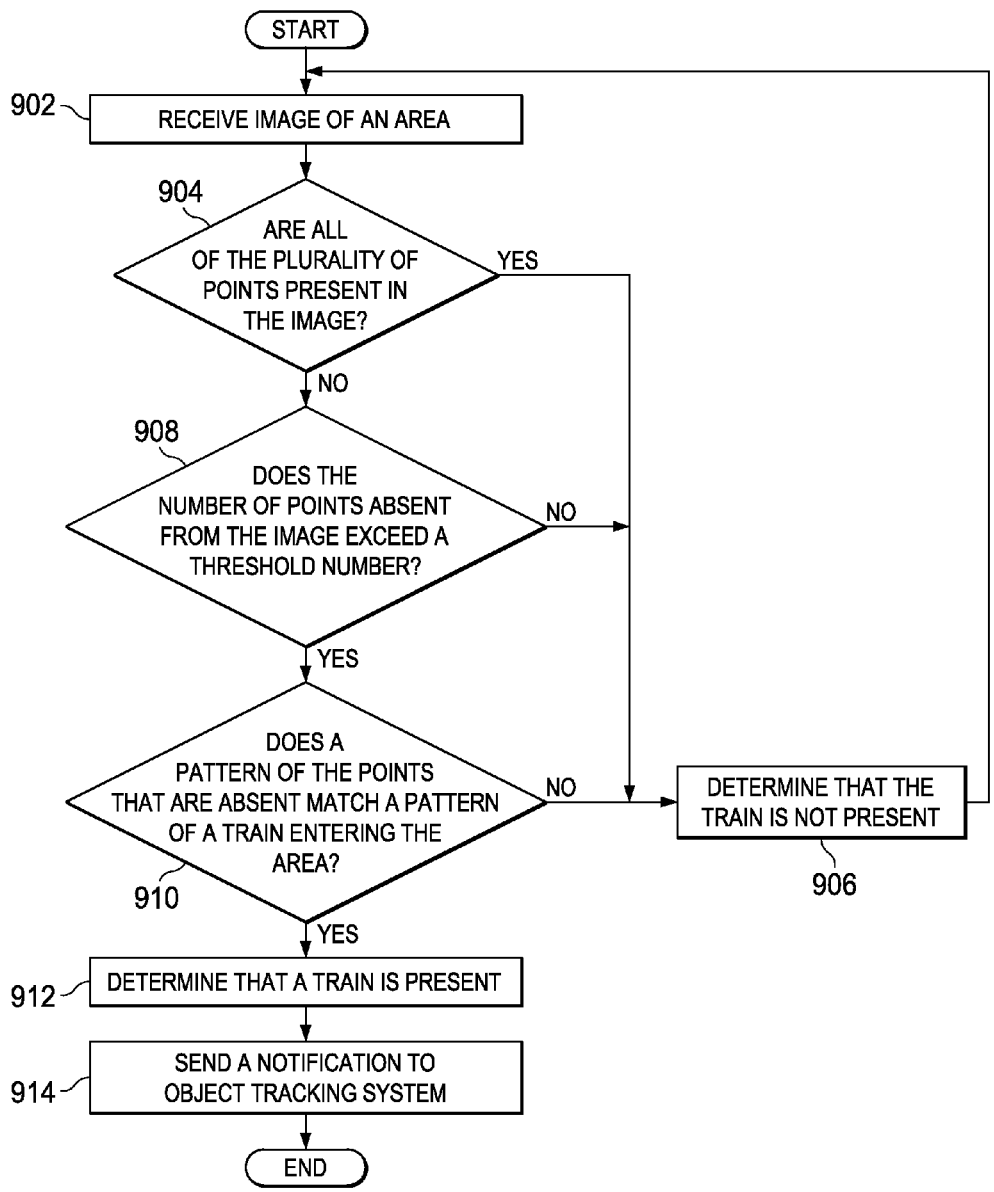
FIG. 9 is a flowchart of a process for identifying when a train is present in a region of interest in accordance with an illustrative embodiment.

With reference now to FIG. 9, an illustration of a flowchart of a process for identifying when a train is present in a region of interest is depicted in accordance with an illustrative embodiment. The process illustrated in FIG. 9 may be implemented by region monitoring process 220 in region monitoring system 204 in FIG. 2. The process also may be implemented in train detection system 344 in FIG. 3.

The process begins by receiving image of an area (step 902). The process then determines whether all of the plurality of points is present in the image (step 904). If the process determines that all of the plurality of points are present in the image, the process determines that the train is not present (step 906). Thereafter, the process returns to step 902 and receives another image of the area.

If, however, the process determines that a number of the plurality of points is not present in the image, the process determines whether the number of points absent from the image exceeds a threshold number (step 908). If the process determines that the number of points absent from the image does not exceed the threshold number, the process returns to step 906 and determines that the train is not present.

If, however, the process determines that the number of points absent from the image exceeds the threshold number, the process determines whether a pattern of the points that are absent matches a pattern of a train entering the area (step 910). If the process determines that the pattern of the points that are absent does not match a pattern of a train entering the area, the process returns to step 906 and determines that the train is not present.

If, however, the process determines that the pattern of the points that are absent does match a pattern of a train entering the area, the process determines that a train is present (step 912). Thereafter, the process sends a notification to object tracking system, with the process terminating thereafter (step 914).

Figure 10:
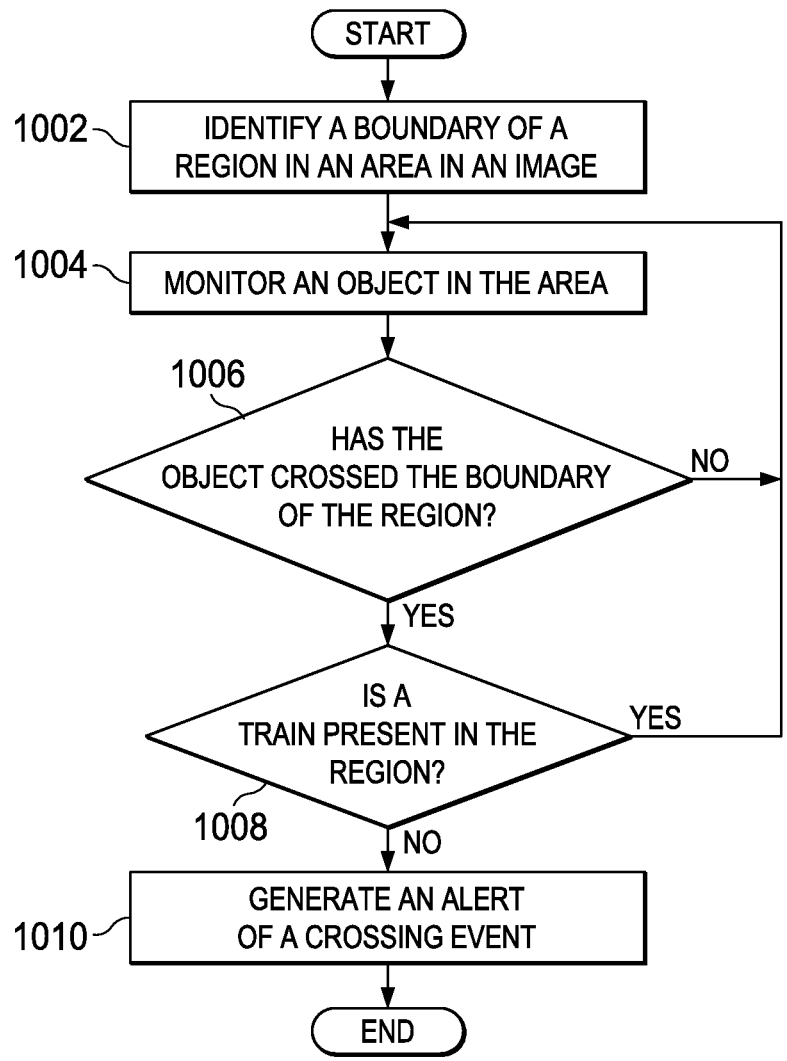
FIG. 10 is a flowchart of a process for improving reliability in detecting crossing events in accordance with an illustrative embodiment.

With reference now to FIG. 10, an illustration of a flowchart of a process for improving reliability in detecting crossing events is depicted in accordance with an illustrative embodiment. The process illustrated in FIG. 10 may be implemented by object monitoring process 408 in FIG. 4 in connection with region monitoring process 301 in FIG. 3.

The process begins by identifying a boundary of a region in an area in an image (step 1002). In step 1002, the boundary may also have a width such that an alert will not be generated until an object has crossed the width of the boundary. Thereafter, the process monitors an object in the area (step 1004). The process then determines whether the object has crossed the boundary of the region (step 1006). If the process determines that the object has not crossed the boundary of the region, the process returns to step 1004 and continues to monitor the object in the area.

If the process determines that the object has crossed the boundary of the region, the process determines whether a train is present in the region (step 1008). In step 1008, the process may receive a notification if and when a train is present in the region from a train detection system such as train detection system 344 in FIG. 3. If the process determines that a train is present in the region, the process returns to step 1004 and monitors the object in the area. The presence of the train indicates that objects may cross the boundary to enter the train. The presence of the train may also indicate that movement in the area may have been caused by the train. Thus, the process will not generate an alert when no crossing event has in-fact occurred. The process improves the reliability in detecting rail crossing events. If the process determines that a train is present in the region, the process generates an alert of a crossing event, with the process terminating thereafter (step 1010).

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Turning now to FIG. 11, an illustration of a block diagram of a data processing system is depicted in accordance with an illustrative embodiment. In this illustrative example, data processing system 1100 includes communications fabric 1102, which provides communications between processor unit 1104, memory 1106, persistent storage 1108, communications unit 1110, input/output (I/O) unit 1112, and display 1114. In these illustrative examples, data processing system 1100 is an example of one implementation of data processing system in FIG. 1. Data processing system 1100 is also one example of train detection system 334 in FIG. 3.

Processor unit 1104 serves to process instructions for software that may be loaded into memory 1106. Processor unit 1104 may be a number of processors, a multi-processor core, or some other type of processor, depending on the particular implementation. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications fabric 1102. In these illustrative examples, the instructions are in a functional form on persistent storage 1108. These instructions may be loaded into memory 1106 for processing by processor unit 1104. The processes of the different embodiments may be performed by processor unit 1104 using computer implemented instructions, which may be located in a memory, such as memory 1106.

These instructions are referred to as program code, computer usable program code, or computer readable program code that may be read and processed by a processor in processor unit 1104. The program code in the different embodiments may be embodied on different physical or tangible computer readable media, such as memory 1106 or persistent storage 1108.

Program code 1118 is located in a functional form on computer readable media 1120 that is selectively removable and may be loaded onto or transferred to data processing system 1100 for processing by processor unit 1104. Program code 1118 and computer readable media 1120 form computer program product 1122 in these examples. In one example, computer readable media 1120 may be computer readable storage media 1124 or computer readable signal media 1126. Computer readable storage media 1124 may include, for example, an optical or magnetic disk that is inserted or placed into a drive or other device that is part of persistent storage 1108 for transfer onto a storage device, such as a hard drive, that is part of persistent storage 1108. Computer readable storage media 1124 also may take the form of a persistent storage, such as a hard drive, a thumb drive, or a flash memory, that is connected to data processing system 1100. In some instances, computer readable storage media 1124 may not be removable from data processing system 1100. In these illustrative examples, computer readable storage media 1124 is a non-transitory computer readable storage medium.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

Program code 1118 may include program code for monitoring an object, such as, for example, object monitoring process 214 in FIG. 2. Program code 1118 may include program code for monitoring a region, such as, for example, region monitoring process 220 in FIG. 2.

The different components illustrated for data processing system 1100 are not meant to provide architectural limitations to the manner in which different embodiments may be implemented. The different illustrative embodiments may be implemented in a data processing system including components in addition to, or in place of, those illustrated for data processing system 1100. Other components shown in FIG. 11 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1118 may be omitted, because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

As another example, a storage device in data processing system 1100 is any hardware apparatus that may store data. Memory 1106, persistent storage 1108, and computer readable media 1120 are examples of storage devices in a tangible form.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1106, or a cache, such as found in an interface and memory controller hub that may be present in communications fabric 1102.

As another example, a storage device in data processing system 1100 is any hardware apparatus that may store data. Memory 1106, persistent storage 1108, and computer readable media 1120 are examples of storage devices in a tangible form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for monitoring objects, the method comprising:
   receiving a plurality of images of an area;
   identifying an object in the area from the plurality of images;
   identifying a plurality of points in a region within the area from a first image in the plurality of images, wherein the plurality of points has a fixed relationship with each other and the region;
   monitoring the object in the area to determine whether the object has entered the region; and
   responsive to identifying an absence of a number of the plurality of points in a second image in the plurality of images, determining, using a processor unit, that a train has entered the region rather than the object.

2. The method of claim 1, wherein responsive to identifying the absence of the number of the plurality of points in the second image in the plurality of images, determining that the object has not entered the region comprises:
   determining whether the number of the plurality of points that are absent from the second image exceeds a threshold number; and
   responsive to determining that the number of the plurality of points that are absent from the second image exceeds the threshold number, determining that the object has not entered the region.

3. The method of claim 2 further comprising:
   identifying a type of the object from the plurality of images;
   identifying a size of the object based on the type of the object; and
   selecting the threshold number based on a distance between points in the plurality of points and the size of the object.

4. The method of claim 1, wherein the region includes a portion of a set of train tracks, and wherein responsive to identifying the absence of the number of the plurality of points in the second image in the plurality of images, determining that the object has not entered the region comprises:
   determining whether a first pattern formed by the number of the plurality of points that are absent from the second image matches a second pattern formed by a train entering the area on the set of train tracks; and
   responsive to determining that the first pattern matches the second pattern, determining that the train has entered the region rather than the object.

5. The method of claim 1, wherein identifying the object in the area from the plurality of images comprises:
   comparing images in the plurality of images to identify similarities between the images;
   identifying the similarities as a set of background objects;
   removing the set of background objects from a received image in the plurality of images;
   identifying objects remaining in the received image as a set of foreground objects; and
   identifying the object from the set of foreground objects;
   the method further comprising:
   monitoring the set of foreground objects; and
   responsive to identifying that the absence of the number of the plurality of points appear in more than one image in the plurality of images, identifying the train as one of the set of foreground objects rather than one of the set of background objects.

6. The method of claim 1, wherein identifying the plurality of points in the region within the area from the first image in the plurality of images comprises:
   identifying a value for texture at a plurality of segments within the first image;
   identifying an amount of contrast in texture between a first segment and a second segment adjacent to the first segment in the first image; and responsive to the amount of contrast in texture between the first segment and the second segment exceeding a threshold amount, identifying a point associated with one of the first segment and the second segment as one of the plurality of points in the region.

7. The method of claim 6, wherein the area is a train station, wherein the region includes a portion of a set of train tracks, and wherein the plurality of points include a plurality of points along a rail on a track in the set of train tracks pictured in the first image.

8. The method of claim 7, wherein the plurality of points form a curve along an edge of the rail pictured in the first image and wherein the plurality of points are identified by detecting the edge of the rail in the first image.

9. The method of claim 1, wherein monitoring the object in the area to determine whether the object has entered the region comprises:
identifying a boundary surrounding the region in the area;
setting a width of the boundary; and
responsive to identifying, from an image in the plurality of images, that the object has crossed the width of the boundary, determining that the object has entered the region.

10. An apparatus for monitoring objects, the apparatus comprising:
an object monitoring system operably connected to a camera, the object monitoring system configured to identify an object in an area from a plurality of images of the area generated by the camera and monitor the object in the area to determine whether the object has entered a region within the area, wherein the region includes a portion of a set of train tracks; and
a train detection system comprising a processing unit and operably connected to the object monitoring system, the train detection system configured to:
identify a plurality of points in a region within the area from a first image in the plurality of images, and
determine that a train has entered the region rather than the object response to identifying an absence of a number of the plurality of points in a second image in the plurality of images, wherein the plurality of points has a fixed relationship with each other and the region,
wherein the object monitoring system is further configured to identify a type of the object from the plurality of images and identify a size of the object based on the type of the object and wherein the train detection system is configured to determine that the train has entered the region by determining whether the number of the plurality of points that are absent from the second image exceeds a threshold number, wherein the threshold number is selected based on a distance between points in the plurality of points and the size of the object.

11. The apparatus of claim 10, wherein the train detection system is configured to determine that the train has entered the region by determining whether a first pattern formed by the number of the plurality of points that are absent from the second image matches a second pattern firmed by the train entering the area on the set of train tracks.

12. The apparatus of claim 10, wherein the train detection system is configured to identify the plurality of points in the region within the area from the first image in the plurality of images by identifying a value for texture at a plurality of segments within the first image, identifying an amount of contrast in texture between a first segment and a second segment adjacent to the first segment in the first image, and identify a point associated with one of the first segment and the second segment as one of the plurality of points in the region in response to the amount of contrast in texture between the first segment and the second segment exceeding a threshold amount.

13. A computer program product for monitoring objects, the computer program product comprising:
a set of computer readable storage devices;
program code, stored on one of the set of computer readable storage devices, configured to receive a plurality of images of an area;
program code, stored on one of the set of computer readable storage devices, configured to identify an object in the area from the plurality of images;
program code, stored on one of the set of computer readable storage devices, configured to identify a plurality of points in a region within the area from a first image in the plurality of images, wherein the plurality of points has a fixed relationship with each other and the region;
program code, stored on one of the set of computer readable storage devices, configured to monitor the object in the area to determine whether the object has entered the region; and
program code, stored on one of the set of computer readable storage devices, configured to determine that a train has entered the region rather than the object in response to identifying an absence of a number of the plurality of points in a second image in the plurality of images.

14. The computer program product of claim 13, wherein the program code configured to determine that the object has not entered the region in response to identifying the absence of the number of the plurality of points in the second image in the plurality of images comprises:
program code, stored on one of the set of computer readable storage devices, configured to determine whether the number of the plurality of points that are absent from the second image exceeds a threshold number; and
program code, stored on one of the set of computer readable storage devices, configured to determine that the object has not entered the region in response to determining that the number of the plurality of points that are absent from the second image exceeds the threshold number.

15. The computer program product of claim 13, wherein the region includes a portion of a set of train tracks, and wherein the program code configured to determine that the object has not entered the region in response to identifying the absence of the number of the plurality of points in the second image in the plurality of images comprises:
program code, stored on one of the set of computer readable storage devices, configured to determine whether a first pattern formed by the number of the plurality of points that are absent from the second image matches a second pattern formed by a train entering the area on the set of train tracks; and
program code, stored on one of the set of computer readable storage devices, configured to determine that the train has entered the region rather than the object in response to determining that the first pattern matches the second pattern.

16. The computer program product of claim 13, wherein the program code configured to identify the plurality of points in the region within the area from the first image in the plurality of images comprises:
program code, stored on one of the set of computer readable storage devices, configured to identify a value for texture at a plurality of segments within the first image;
program code, stored on one of the set of computer readable storage devices, configured to identify an amount of contrast in texture between a first segment and a second segment adjacent to the first segment in the first image; and program code, stored on one of the set of computer readable storage devices, configured to identify a point associated with one of the first segment and the second segment as one of the plurality of points in the region in response to the amount of contrast in texture between the first segment and the second segment exceeding a threshold amount.

17. A data processing system for monitoring objects; the data processing system comprising:

a bus system;

a storage device connected to the bus system, wherein the storage device includes program code; and a processor unit connected to the bus system, wherein the processor unit is configured to execute the program code to receive a plurality of images of an area, identify an object in the area from the plurality of images, identify a plurality of points in a region within the area from a first image in the plurality of images, wherein the plurality of points has a fixed relationship with each other and the region, monitor the object in the area to determine whether the object has entered the region, and determine that a train has entered the region rather than the object in response to identifying an absence of a number of the plurality of points in a second image in the plurality of images.

18. The data processing system of claim 17, wherein in executing the program code to determine that the object has not entered the region in response to identifying the absence of the number of the plurality of points in the second image in the plurality of images the processor unit is further configured to execute the program code to determine whether the number of the plurality of points that are absent from the second image exceeds a threshold number and determine that the object has not entered the region in response to determining that the number of the plurality of points that are absent from the second image exceeds the threshold number.

19. The data processing system of claim 17, wherein the region includes a portion of a set of train tracks, and wherein in executing the program code to determine that the object has not entered the region in response to identifying the absence of the number of the plurality of points in the second image in the plurality of images the processor unit is further configured to determine whether a first pattern formed by the number of the plurality of points that are absent from the second image matches a second pattern formed by a train entering the area on the set of train tracks and determine that the train has entered the region rather than the object in response to determining that the first pattern matches the second pattern.

20. The data processing system of claim 17, wherein in executing the program code to identify the plurality of points in the region within the area from the first image in the plurality of images the processor unit is further configured to identify a value for texture at a plurality of segments within the first image, identify an amount of contrast in texture between a first segment and a second segment adjacent to the first segment in the first image, and identify a point associated with one of the first segment and the second segment as one of the plurality of points in the region in response to the amount of contrast in texture between the first segment and the second segment exceeding a threshold amount.

* * * * *